United States Patent
Cox, III

(10) Patent No.: US 11,201,823 B2
(45) Date of Patent: *Dec. 14, 2021

(54) MOBILE CORE DYNAMIC TUNNEL END-POINT PROCESSING

(71) Applicant: Cisco Technology, Inc., San Jose, CA (US)

(72) Inventor: William Otho Cox, III, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,190

(22) Filed: Mar. 26, 2020

(65) Prior Publication Data
US 2020/0228450 A1    Jul. 16, 2020

Related U.S. Application Data

(63) Continuation of application No. 16/121,509, filed on Sep. 4, 2018, now Pat. No. 10,652,152.

(51) Int. Cl.
*H04L 12/801*    (2013.01)
*H04L 12/66*    (2006.01)
(Continued)

(52) U.S. Cl.
CPC .......... *H04L 47/12* (2013.01); *H04L 12/4633* (2013.01); *H04L 12/66* (2013.01); *H04L 45/38* (2013.01); *H04L 47/19* (2013.01)

(58) Field of Classification Search
CPC ..... H04L 47/12; H04L 12/4633; H04L 12/66; H04L 45/38; H04L 47/19
See application file for complete search history.

(56) References Cited

U.S. PATENT DOCUMENTS 4,236,068 A    11/1980    Walton
5,642,303 A    6/1997    Small et al.
(Continued)

FOREIGN PATENT DOCUMENTS

WO    WO 2013/020126    2/2013
WO    WO 2014/098556    6/2014
(Continued)

OTHER PUBLICATIONS

International Search Report and Written Opinion from the International Searching Authority, dated Apr. 21, 2020, 17 pages, for corresponding International Patent Application No. PCT/US2019/049487.

(Continued)

*Primary Examiner* — Kyaw Z Soe
(74) *Attorney, Agent, or Firm* — Polsinelli PC

(57) ABSTRACT

The present technology is directed to a system and method for using cloud based processing to co-locate one or more tunnel end points, associated with mobile user generated traffic traversing a Core network, with the serving machine located on application provider network. The describe system/method involves early stage identification of traffic flow (i.e., at the Packet Data network Gateway device using Application Detection and Control function) and dynamically instantiating an end point for the aforementioned traffic flow at the server where the application request is being served. The traffic is then directly tunneled to the endpoint thus avoiding decapsulated mobile traffic from traversing across provider network.

20 Claims, 5 Drawing Sheets

(51) Int. Cl.
*H04L 12/721* (2013.01)
*H04L 12/46* (2006.01)

(56) References Cited

U.S. PATENT DOCUMENTS

| | | |
|---|---|---|
| 5,751,223 A | 5/1998 | Turner |
| 6,812,824 B1 | 11/2004 | Goldinger et al. |
| D552,603 S | 10/2007 | Tierney |
| 7,573,862 B2 | 8/2009 | Chambers et al. |
| D637,569 S | 5/2011 | Desai et al. |
| 7,975,262 B2 | 7/2011 | Cozmei |
| 8,010,079 B2 | 8/2011 | Mia et al. |
| 8,102,814 B2 | 1/2012 | Rahman et al. |
| 8,260,320 B2 | 9/2012 | Herz |
| 8,284,748 B2 | 10/2012 | Borghei |
| 8,300,594 B1 | 10/2012 | Bernier et al. |
| 8,325,626 B2 | 12/2012 | Tóth et al. |
| 8,396,485 B2 | 3/2013 | Grainger et al. |
| 8,446,899 B2 | 5/2013 | Lei et al. |
| 8,457,145 B2 | 6/2013 | Zimmerman et al. |
| 8,458,184 B2 | 6/2013 | Dorogusker et al. |
| D691,636 S | 10/2013 | Bunton |
| 8,549,638 B2 | 10/2013 | Aziz |
| 8,553,634 B2 | 10/2013 | Chun et al. |
| 8,644,301 B2 | 2/2014 | Tamhankar et al. |
| 8,650,279 B2 | 2/2014 | Mehta et al. |
| 8,669,902 B2 | 3/2014 | Pandey et al. |
| 8,676,182 B2 | 3/2014 | Bell et al. |
| 8,682,279 B2 | 3/2014 | Rudolf et al. |
| 8,693,367 B2 | 4/2014 | Chowdhury et al. |
| 8,718,644 B2 | 5/2014 | Thomas et al. |
| 8,761,174 B2 | 6/2014 | Jing et al. |
| 8,768,389 B2 | 7/2014 | Nenner et al. |
| 8,849,283 B2 | 9/2014 | Rudolf et al. |
| 8,909,698 B2 | 12/2014 | Parmar et al. |
| 8,958,318 B1 | 2/2015 | Hastwell et al. |
| 9,060,352 B2 | 6/2015 | Chan et al. |
| 9,130,859 B1 | 9/2015 | Knappe |
| 9,173,084 B1 | 10/2015 | Foskett |
| 9,173,158 B2 | 10/2015 | Varma |
| D744,464 S | 12/2015 | Snyder et al. |
| 9,270,709 B2 | 2/2016 | Shatzkamer et al. |
| 9,271,216 B2 | 2/2016 | Friman et al. |
| 9,281,955 B2 | 3/2016 | Moreno et al. |
| D757,424 S | 5/2016 | Phillips et al. |
| D759,639 S | 6/2016 | Moon et al. |
| 9,369,387 B2 | 6/2016 | Filsfils et al. |
| 9,389,992 B2 | 7/2016 | Gataullin et al. |
| 9,426,305 B2 | 8/2016 | De Foy et al. |
| D767,548 S | 9/2016 | Snyder et al. |
| 9,467,918 B1 | 10/2016 | Kwan |
| D776,634 S | 1/2017 | Lee et al. |
| 9,544,337 B2 | 1/2017 | Eswara et al. |
| 9,569,771 B2 | 2/2017 | Lesavich et al. |
| 9,609,504 B2 | 3/2017 | Karlqvist et al. |
| 9,615,268 B2 | 4/2017 | Navarro et al. |
| 9,634,952 B2 | 4/2017 | Gopinathan et al. |
| 9,642,167 B1 | 5/2017 | Snyder et al. |
| 9,654,344 B2 | 5/2017 | Chan et al. |
| 9,712,444 B1 | 7/2017 | Bolshinsky et al. |
| 9,713,114 B2 | 7/2017 | Yu |
| 9,736,056 B2 | 8/2017 | Vasseur et al. |
| 9,762,683 B2 | 9/2017 | Karampurwala et al. |
| 9,772,927 B2 | 9/2017 | Gounares et al. |
| 9,820,105 B2 | 11/2017 | Snyder et al. |
| D804,450 S | 12/2017 | Spiel et al. |
| 9,858,559 B2 | 1/2018 | Raleigh et al. |
| 9,860,151 B2 | 1/2018 | Ganichev et al. |
| 9,933,224 B2 | 2/2018 | Dumitriu et al. |
| 9,923,780 B2 | 3/2018 | Rao et al. |
| 9,961,560 B2 | 5/2018 | Farkas et al. |
| 9,967,906 B2 | 5/2018 | Verkaik et al. |
| 9,980,220 B2 | 5/2018 | Snyder et al. |
| 9,985,837 B2 | 5/2018 | Rao et al. |
| 9,998,368 B2 | 6/2018 | Chen et al. |
| 2003/0087645 A1 | 5/2003 | Kim et al. |
| 2003/0116634 A1 | 6/2003 | Tanaka |
| 2004/0203572 A1 | 10/2004 | Aerrabotu et al. |
| 2005/0090225 A1 | 4/2005 | Muehleisen et al. |
| 2005/0169193 A1 | 8/2005 | Black et al. |
| 2005/0186904 A1 | 8/2005 | Kowalski et al. |
| 2006/0022815 A1 | 2/2006 | Fischer et al. |
| 2006/0030290 A1 | 2/2006 | Rudolf et al. |
| 2006/0092964 A1 | 5/2006 | Park et al. |
| 2006/0126882 A1 | 6/2006 | Deng et al. |
| 2006/0187866 A1 | 8/2006 | Werb et al. |
| 2007/0037605 A1 | 2/2007 | Logan |
| 2007/0239854 A1 | 10/2007 | Janakiraman et al. |
| 2008/0037715 A1 | 2/2008 | Prozeniuk et al. |
| 2008/0084888 A1 | 4/2008 | Yadav et al. |
| 2008/0101381 A1 | 5/2008 | Sun et al. |
| 2008/0163207 A1 | 7/2008 | Reumann et al. |
| 2008/0233969 A1 | 9/2008 | Mergen |
| 2009/0129389 A1 | 5/2009 | Halna DeFretay et al. |
| 2009/0203370 A1 | 8/2009 | Giles et al. |
| 2009/0282048 A1 | 11/2009 | Ransom et al. |
| 2009/0298511 A1 | 12/2009 | Paulson |
| 2009/0307485 A1 | 12/2009 | Weniger et al. |
| 2010/0039280 A1 | 2/2010 | Holm et al. |
| 2010/0097969 A1 | 4/2010 | De Kimpe et al. |
| 2011/0087799 A1 | 4/2011 | Padhye et al. |
| 2011/0142053 A1 | 6/2011 | Van Der Merwe et al. |
| 2011/0182295 A1 | 7/2011 | Singh et al. |
| 2011/0194553 A1 | 8/2011 | Sahin et al. |
| 2011/0228779 A1 | 9/2011 | Goergen |
| 2012/0023552 A1 | 1/2012 | Brown et al. |
| 2012/0054367 A1 | 3/2012 | Ramakrishnan et al. |
| 2012/0088476 A1 | 4/2012 | Greenfield |
| 2012/0115512 A1 | 5/2012 | Grainger et al. |
| 2012/0157126 A1 | 6/2012 | Rekimoto |
| 2012/0167207 A1 | 6/2012 | Beckley et al. |
| 2012/0182147 A1 | 7/2012 | Forster |
| 2012/0311127 A1 | 12/2012 | Kandula et al. |
| 2012/0324035 A1 | 12/2012 | Cantu et al. |
| 2013/0029685 A1 | 1/2013 | Moshfeghi |
| 2013/0039391 A1 | 2/2013 | Skarp |
| 2013/0057435 A1 | 3/2013 | Kim |
| 2013/0077612 A1 | 3/2013 | Khorami |
| 2013/0088983 A1 | 4/2013 | Pragada et al. |
| 2013/0107853 A1 | 5/2013 | Pettus et al. |
| 2013/0108263 A1 | 5/2013 | Srinivas et al. |
| 2013/0115916 A1 | 5/2013 | Herz |
| 2013/0145008 A1 | 6/2013 | Kannan et al. |
| 2013/0155906 A1 | 6/2013 | Nachum et al. |
| 2013/0191567 A1 | 7/2013 | Rofougaran et al. |
| 2013/0203445 A1 | 8/2013 | Grainger et al. |
| 2013/0217332 A1 | 8/2013 | Altman et al. |
| 2013/0232433 A1 | 9/2013 | Krajec et al. |
| 2013/0273938 A1 | 10/2013 | Ng et al. |
| 2013/0317944 A1 | 11/2013 | Huang et al. |
| 2013/0322438 A1 | 12/2013 | Gospodarek et al. |
| 2013/0343198 A1 | 12/2013 | Chhabra et al. |
| 2013/0347103 A1 | 12/2013 | Veteikis et al. |
| 2014/0007089 A1 | 1/2014 | Bosch et al. |
| 2014/0016926 A1 | 1/2014 | Soto et al. |
| 2014/0025770 A1 | 1/2014 | Warfield et al. |
| 2014/0031031 A1 | 1/2014 | Gauvreau et al. |
| 2014/0052508 A1 | 2/2014 | Pandey et al. |
| 2014/0059655 A1 | 2/2014 | Beckley et al. |
| 2014/0087693 A1 | 3/2014 | Walby et al. |
| 2014/0105213 A1 | 4/2014 | A K et al. |
| 2014/0118113 A1 | 5/2014 | Kaushik et al. |
| 2014/0148196 A1 | 5/2014 | Bassan-Eskenazi et al. |
| 2014/0179352 A1 | 6/2014 | V.M. et al. |
| 2014/0191868 A1 | 7/2014 | Ortiz et al. |
| 2014/0198808 A1 | 7/2014 | Zhou |
| 2014/0222997 A1 | 8/2014 | Mermoud et al. |
| 2014/0233460 A1 | 8/2014 | Pettus et al. |
| 2014/0269321 A1 | 9/2014 | Kamble et al. |
| 2014/0302869 A1 | 10/2014 | Rosenbaum et al. |
| 2014/0337824 A1 | 11/2014 | St. John et al. |
| 2014/0341568 A1 | 11/2014 | Zhang et al. |
| 2015/0016286 A1 | 1/2015 | Ganichev et al. |
| 2015/0016469 A1 | 1/2015 | Ganichev et al. |

(56) References Cited

U.S. PATENT DOCUMENTS

| | | | |
|---|---|---|---|
| 2015/0023176 A1 | 1/2015 | Korja et al. | |
| 2015/0030024 A1 | 1/2015 | Venkataswami et al. | |
| 2015/0043581 A1 | 2/2015 | Devireddy et al. | |
| 2015/0063166 A1 | 3/2015 | Sif et al. | |
| 2015/0065161 A1 | 3/2015 | Ganesh et al. | |
| 2015/0087330 A1 | 3/2015 | Prechner et al. | |
| 2015/0103818 A1 | 4/2015 | Kuhn et al. | |
| 2015/0163192 A1 | 6/2015 | Jain et al. | |
| 2015/0172391 A1 | 6/2015 | Kasslin et al. | |
| 2015/0223337 A1 | 8/2015 | Steinmacher-Burow | |
| 2015/0256972 A1 | 9/2015 | Markhovsky et al. | |
| 2015/0264519 A1 | 9/2015 | Mirzaei et al. | |
| 2015/0280827 A1 | 10/2015 | Adiletta et al. | |
| 2015/0288410 A1 | 10/2015 | Adiletta et al. | |
| 2015/0326704 A1 | 11/2015 | Ko et al. | |
| 2015/0358777 A1 | 12/2015 | Gupta | |
| 2015/0362581 A1 | 12/2015 | Friedman et al. | |
| 2016/0007315 A1 | 1/2016 | Lundgreen et al. | |
| 2016/0044627 A1 | 2/2016 | Aggarwal et al. | |
| 2016/0099847 A1 | 4/2016 | Melander et al. | |
| 2016/0100395 A1 | 4/2016 | Xu et al. | |
| 2016/0105408 A1 | 4/2016 | Cooper et al. | |
| 2016/0127875 A1 | 5/2016 | Zampini, II | |
| 2016/0146495 A1 | 5/2016 | Malve et al. | |
| 2016/0330045 A1 | 11/2016 | Tang et al. | |
| 2016/0344641 A1 | 11/2016 | Javidi et al. | |
| 2016/0352633 A1* | 12/2016 | Kapadia | H04L 12/4625 |
| 2017/0026974 A1 | 1/2017 | Dey et al. | |
| 2017/0064751 A1 | 3/2017 | Sjödin et al. | |
| 2017/0180999 A1 | 6/2017 | Alderfer et al. | |
| 2017/0181136 A1 | 6/2017 | Bharadwaj et al. | |
| 2017/0195205 A1 | 7/2017 | Li et al. | |
| 2017/0202000 A1 | 7/2017 | Fu et al. | |
| 2017/0214551 A1 | 7/2017 | Chan et al. | |
| 2017/0230281 A1* | 8/2017 | Newell | H04L 12/4641 |
| 2017/0273083 A1 | 9/2017 | Chen et al. | |
| 2017/0317997 A1 | 11/2017 | Smith et al. | |
| 2017/0332421 A1 | 11/2017 | Sternberg et al. | |
| 2017/0339706 A1 | 11/2017 | Andreoli-Fang et al. | |
| 2018/0063018 A1 | 3/2018 | Bosch et al. | |
| 2018/0069311 A1 | 3/2018 | Pallas et al. | |
| 2018/0084389 A1 | 3/2018 | Snyder et al. | |
| 2018/0176134 A1* | 6/2018 | Pignataro | H04L 67/10 |
| 2018/0352448 A1 | 12/2018 | Ryu et al. | |

FOREIGN PATENT DOCUMENTS

| | | |
|---|---|---|
| WO | WO 2015/131920 | 9/2015 |
| WO | WO 2017/078657 | 5/2017 |
| WO | WO 2017/082682 A1 | 5/2017 |
| WO | WO 2017/187011 | 11/2017 |
| WO | WO 2018/009340 | 1/2018 |
| WO | WO 2018/028777 | 2/2018 |
| WO | WO 2018/053271 | 3/2018 |
| WO | WO 2018/066362 | 4/2018 |

OTHER PUBLICATIONS

"Universal Mobile Telecommunications System (UMTS); LTE; General Packet Radio Systems (GPRS) Tunnelling Protocol User Plane (GTPv1-U) (3GPP TS 29.281 version 15.3.0 Release 15)," ETSI Technical Specification, European Telecommunications Standards Institute (ETSI), 650, Route Des Lucioles; F-06921 Sophia-Antipolos, France, Jul. 30, 2018, pp. 1-34.
"Cisco ASR 5x00 Mobility Management Entity Administration Guide," Version 15.0, Cisco Systems, Inc., Last updated Jun. 13, 2014, pp. 1-266.
"Quality of Service Regulation Manual," ITU 2017, pp. 1-174.
"Wi-FI Location-Based Services 4.1 Design Guide," May 20, 2008, 206 pages.
"Cisco 10000 Series Router Quality of Service Configuration Guide, Chapter 20: Configuring Quality of Service for MPLS Traffic," Cisco Systems, Inc., Updated Nov. 17, 2013, pp. 1-34.
"Enterprise Mobility 7.3 Design Guide, Chapter 11: Cisco Mobility Services Engine," Cisco Systems, Inc., Updated Apr. 20, 2015, 8 pages.
"I Love WiFi, The difference between L2 and L3 Roaming Events," Apr. 1, 2010, 6 pages.
Afolabi, Ibrahim, et al., "Network Slicing & Softwarization: A Survey on Principles, Enabling Technologies & Solutions," Mar. 21, 2018, pp. 1-24.
Ali, Z., et al., "Performance Measurement in Segment Routing Networks with IPv6 Data Plane (SRv6)," Spring Working Group, Feb. 26, 2018, pp. 1-17.
Antonioli, Roberto, et al., "Dual Connectivity for LTE-NR Cellular Networks," Research Gate, Sep. 3-6, 2017, pp. 171-175.
Bekan, Adnan, et al., "D5.1: Machine Learning Algorithms Development and Implementation," 2016-2018 eWINE Consortium, 23, 2016, pp. 1-72.
Bogale, Tadilo Endeshaw, et al., "Machine Intelligence Techniques for Next-Generation Context-Aware Wireless Networks," arxiv.org, Jan. 12, 2018, pp. 1-10.
Carter, Steve Sr., "E911 VoIP Essentials For Enterprise Deployments," XO Communications, LLC, 2012, 9 pages.
Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.
Cheng, W., et al., "Path Segment in MPLS Based Sement Routing Network," Network Working Group, Oct. 2017, pp. 1-10.
Christidis, Konstantinos, et al., "Blockchains and Smart Contracts for the Internet of Things," IEEE Access, Special Section on the of Research in Internet of Things (IoT), vol. 4, May 10, 2016, pp. 1-12.
Cox, Jacob H. Jr., et al., "Advancing Software-Defined Networks: A Survey," IEEE, Oct. 12, 2017, pp. 25487-25526.
Cui, Wenzhi et al., "DiFS: Distributed Flow Scheduling for Data Center Networks," Nanjing University, China, Jul. 28, 2013, 10 pages.
Doyle, Matthew G., "An IP Address Management Solution for a Server Solution Provider," A Dissertation Submitted to The University of Liverpool, Sep. 28, 2005, 116 pages.
Galvan T., Carlos E., et al., "Wifi bluetooth based combined positioning algorithm," International Meeting of Electrical Engineering Research ENIINVIE 2012, Procedia Engineering 35 (2012), pp. 101-108.
Geller, Michael, et al., "5G Security Innovation with Cisco," Whitepaper Cisco Public, Jun. 8, 2018, pp. 1-29.
Gesbert, David, "Advances in Multiuser MIMO Systems (Tutorial Part II) Emerging Topics in Multiuser MIMO Networks," IEEE PIMRC Conference, Sep. 2007, 107 pages.
Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.
Herb, Daniel, et al., "ROAUM: How to Unblock ROAMING IoT Using BLockchain," available at https://uploads-ssl.webflow.com/5987a08baeea4300016b7bd9/5a7a6d6cee5bc400010a08f2_Roaum_Roaming_IoT_Whitepaper.pdf, pp. 1-14.
Hsieh, Cynthia, "Location Awareness in VMware View 4.5 and Above," VMware, 2011, 8 pages.
Husain, Syed, et al., "Mobile Edge Computing with Network Resource Slicing for Internet-of-Things," IEEE 2017, pp. 1-7.
Jero, Samuel, et al., "Identifier Binding Attacks and Defenses in Software-Defined Networks," USENIX, The Advanced Computing Systems Association, Aug. 16-18, 2017, 19 pages.
Ji, Philip N., et al., "Demonstration of High-Speed MIMO OFDM Flexible Bandwidth Data Center Network," Optical Society of America, 2012, 2 pages.
Kandula, Srikanth, et al., "Flyways to De-Congest Data Center Networks," Microsoft Research, Oct. 23, 2009, 6 pages.
Katayama, Y. et al., "MIMO Link Design Strategy for Wireless Data Center Applications," IEEE Wireless Communications and Networking Conference: Services, Applications, and Business, 2012, 5 pages.
Leary, Jonathan, et al., "Wireless LAN Fundamentals: Mobility," Jan. 9, 2004, Cisco Press, 15 pages.

(56) References Cited

OTHER PUBLICATIONS

Leonhardt, Ulf, "Supporting Location-Awareness in Open Distributed Systems," May 1998, 186 pages.
Morozov, Yury, "Blockchain Telecom: Bubbletone Blockchain," Dec. 29, 2017, pp. 1-33.
Network Heresy, "NVGRE, VXLAN and What Microsoft is Doing Right," Oct. 3, 2011, 5 pages.
Norwegian National Security Authority, "N-03 Security guidance for switches and routers," Sep. 26, 2012, pp. 1-24.
Saraiva de Sousa, Nathan F., et al., "Network Service Orchestration: A Survey," IEEE Communications Surveys & Tutorials, Mar. 23, 2018, pp. 1-30.
Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.
Shwetha, D., et al.,"A Bandwidth Request Mechanism for QoS Enhancement in Mobile WiMAX Networks," International Journal of Advanced Research in Electrical Electronics and Instrumentation Engineering, vol. 3, Issue 1, Jan. 2014, pp. 1-8.
Sun, et al., "The future of Wi-Fi," IEEE Communications Magazine, vol. 52, No. 11, Nov. 21, 2014, 166 pages.
Ventre, Pier Luigi, et al., "Performance Evaluation and Tuning of Virtual Infrastructure Managers for (Micro) Virtual Network Functions," ieee.org, Nov. 7-10, 2016, pp. 1-7.
Wright, Joshua, "Detecting Wireless LAN MAC Address Spoofing," Jan. 21, 2003, pp. 1-20.
Zickau, Sebastian, et al., "Enabling Location-based Policies in a Healthcare Cloud Computing Environment," 2014 IEEE $3^{rd}$ International Conference on Cloud Networking (Cloudnet), Oct. 2014, pp. 353-358.
An et al., "Virtualization of Cellular Network EPC Gateways based on a Scalable SDN Architecture," IEEE, Feb. 12, 2015, pp. 1-7.

\* cited by examiner

MOBILE CORE DYNAMIC TUNNEL END-POINT PROCESSING

CROSS-REFERENCE TO RELATED APPLICATIONS

This application is a Continuation of U.S. application Ser. No. 16/121,509, filed on Sep. 4, 2018, the content of which is incorporated herein by reference in its entirety.

TECHNICAL FIELD

The present technology pertains to managing tunneling over an IP network. More specifically it is directed to next generation mobile user traffic tunneling management across an IP network.

BACKGROUND

Today's Mobile Internet traffic traverses many Tunnels and Hops to reach the applications. This results in latency and internet congestion.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
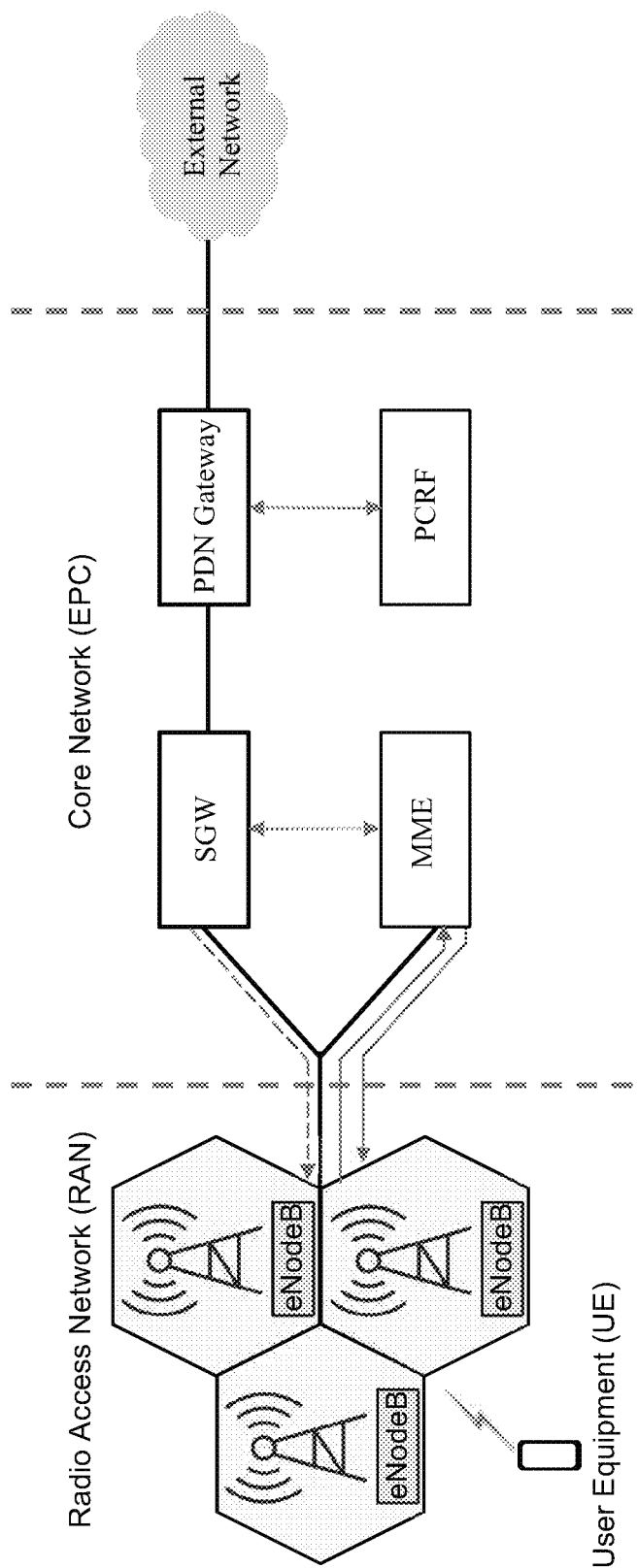
FIG. 1 illustrates an example general Radio Access and Core network for mobile traffic transport, in accordance with some embodiments of the present technology.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Systems, methods, and devices are disclosed for streamlining processing of mobile user traffic across a Core IP network. The described embodiments comprise a service to detect and identify a source application associated with a data traffic flow and locating a serving device associated with the source application. Once source application associated with the data traffic flow is identified a request for instantiation of a tunnel end point processor is dynamically generated and sent to the serving device. The described embodiments further comprise transferring information associated with the source application traffic to the tunnel end point processor that has been dynamically instantiated at the serving device, and forwarding data traffic associated with the source application directly to the tunnel end point processor on the serving device. The source applications may be installed on one or more mobile devices with the corresponding application end-point located on a third party service provider network. Furthermore, detection and identification of application flow may take place on an Packet Data Network Gateway device. The packet data network gateway device may also be responsible for generation of one or more requests to instantiate one or more tunnel end point processors on the application endpoint device. In some embodiments the technology involves segment routing (SRv6) tunnels established between a Packet Data Network Gateway device, such as a tunneling exchange Segment Router, and third party application host device. The segment routing (SRv6) tunnels may be terminated on one or more SRv6 endpoints dynamically instantiated on the third party application host device in response to request from the tunneling exchange Segment Router.

EXAMPLE EMBODIMENTS

For clarity of explanation, in some instances the present technology may be presented as including individual functional blocks including functional blocks comprising devices, device components, steps or routines in a method embodied in software, or combinations of hardware and software.

Mobile phone traffic traverses the internet before reaching a servers CPU/memory. This results in latency and internet congestion. Diversity and amount of traffic generated from mobile applications has significantly increased over the past few years and the trend indicates that it will continue to increase, at least in the near future. This mobile traffic is generally transported via tunnels. Tunneling operation involves encapsulation and decapsulation operations across the Core IP Network. This may increase the delay experienced on the IP network while at the same time negatively impacting packet congestion experienced on the network.

The forgoing challenge with respect to upward scaling of mobile traffic transported over an IP network is addressed through embodiments of the present technology. Some embodiments are directed at cloud-based processing to co-locate an end-point of a tunnel carrying mobile application traffic with the corresponding application server or network device serving as the application endpoint. Co-locating the tunnel end point with the corresponding network resource may be accomplished, in accordance with some embodiments, by dynamically installing a Tunnel End Point Processor (DTEPP) on the application server designated as the end-point for the particular mobile application associated with the tunneled traffic flow. Consequently, the corresponding mobile traffic is directly tunneled to the application server and terminated at the Dynamic Tunnel End Point Processor (DTEPP) installed thereon. Thus circumventing decapsulated mobile traffic from traversing the IP network and exacerbating the congestion and delay performance of the network.

Some embodiments of the present technology describe a method involving instantiation of an application-specific tunnel encapsulation/decapsulation processor at the location of the application endpoint where the requested application service is being accessed. Once application flow is detected and source application identified (for example, by a service running on an edge node), a network service locates the corresponding application endpoint. At this point a network edge device such as the Serving Gateway and/or the PDN Gateway facilitates the installation of a tunnel endpoint processor for the mobile application traffic. Subsequently, the mobile application traffic is then directly tunneled to the specified application endpoint, which is often the server device hosting the mobile application, and directly terminated at the dynamically instantiated tunnel end-point processor installed thereon.

The Core Network (CN), also referred to as the Evolved Packet Core (EPC), is responsible for the data routing, accounting, and policy management of traffic generated by mobile user equipment (UE). The Core Network connects the radio network to the public Internet. FIG. 1 depicts a general Long Term Evolution (LTE) Core Network architecture 100.

With reference to the Core Network Architecture 100 in FIG. 1, User Equipment (UE), such as a mobile phone device used to access the LTE network, is connected to the EPC over the LTE base stations (eNodeB) in the radio access network. The EPC is composed of the following elements: the Mobility Management Entity (MME), the Serving Gateway (SGW), the Packet data network Packet Gateway (PDN Gateway or PGW), and the Policy and Charging Rules Function (PCRF). The MME and PCRF are pure control function entities, which manage the UE's mobility, authentication, traffic treatment policies and charging. The Serving Gateway is the anchor point of the intra-LTE (devices within the radio network) mobility and between LTE and other external access points. It logically interconnects the eNodeBs with the PDN Gateway.

The PDN Gateway serves as the demarcation point between external IP networks and the mobile operator's network (i.e., the public gateway that connects the mobile carrier to the public internet). The PDN Gateway is the termination point for all external connections, regardless of the protocol. When a mobile device is connected to the carrier network, the IP address of the device is allocated and maintained by the PDN Gateway. Because it is the PDN Gateway that terminates all connections, the device radio state is not tied to application layer connectivity: tearing down the radio context within the radio network terminates the physical radio link between the device and the radio tower, but this does not affect the state of any TCP or UDP sessions. The device radio can be idle, with no link to the local radio tower, while the established connections are maintained by the PDN Gateway. Moreover, PDN Gateway enforces Quality of Service (QoS) policies, performs lawful interception, traffic monitoring and billing, etc. The Policy and Charging Rules Function (PCRF) component is responsible for maintaining and evaluating these rules for the packet data network gateway (PDN Gateway). PCRF is a logical component, meaning it can be part of the PDN Gateway, or it can stand on its own.

When PDN Gateway receives incoming packets from the public Internet for one of the mobile devices on its network it may have no knowledge of the actual location of the user, nor the different tracking areas (collection of radio base stations) within the radio access network. This next step is the responsibility of the Serving Gateway (SGW) and the Mobility Management Entity (MME). Accordingly, the PDN Gateway routes all inbound packets to the Serving Gateway. If the Serving Gateway is not aware of the exact location of the user either, it queries the Mobility Management Entity (MME) for the required information. This function is, in fact, one of the core responsibilities of the MME. The Mobility Management Entity (MME) component is effectively a user database, which manages all the states for every user on the network: user location on the network, type of account, billing status, enabled services, in addition to all other user metadata. Whenever a user enters a different tracking area, its location is updated in the MME, but handoffs between radio base stations within the same tracking area do not trigger an update to the MME. Therefore MME may not know the exact base station (eNodeB) currently servicing the user. When the user turns on their phone, the authentication is performed by the MME.

Accordingly, if the device (UE) is idle, the MME sends a paging message to all the radio base stations in the tracking area, which in turn all broadcast a notification on a shared radio channel, indicating that the device (UE) should reestablish its radio context to receive the inbound data. The device periodically wakes to listen to the paging messages, and if it finds itself on the paging list, then it initiates the negotiation with the radio tower to reestablish the radio context.

Once the radio context is established, the base station that performed the negotiation sends a message back to the MME indicating where the user is. The MME then returns the answer to the Serving Gateway, and the Serving Gateway finally routes the message to the tower, which then delivers the message to the device. Once the device is in a connected state, a direct tunnel is established between the radio base station and the Serving Gateway (SGW), which means that further incoming packets are routed directly to the base station without the signaling overhead.

The General Packet Radio Service (GPRS) Tunneling Protocol (GTP) is used as the communication protocol to support traffic tunneling in Log Term Evolution (LTE) networks. For instance, in-between the SGW and PDN Gateway, the designated protocols are used to carry the control signaling messages and user data packets, respectively. The user data packets are carried over flows, which are bound to bearers. A bearer provides a logical transmission channel between a UE and a Packet Data Network (PDN). To ensure the transmission Quality of Service (QoS), a set of QoS parameters is associated with a bearer, indicating the properties of the transmission channel. A traffic flow passing through the network can be identified by the five-tuple of IP source and destination addresses, the port numbers of source and destination, and the Protocol Identifier (PI). Each bearer is associated with a tunnel, the endpoint of which is identified by a Tunnel Endpoint Identifier.

Once through the Service provider's ingress edge router, the traffic is encapsulated and forwarded across the IP-based infrastructure of the Core Network. Alternatively the traffic may be tunneled across the Core IP Network of the service provider and decapsulated on the interface of the provider's Edge Router that carrier the outgoing traffic to the customer site.

Figure 2:
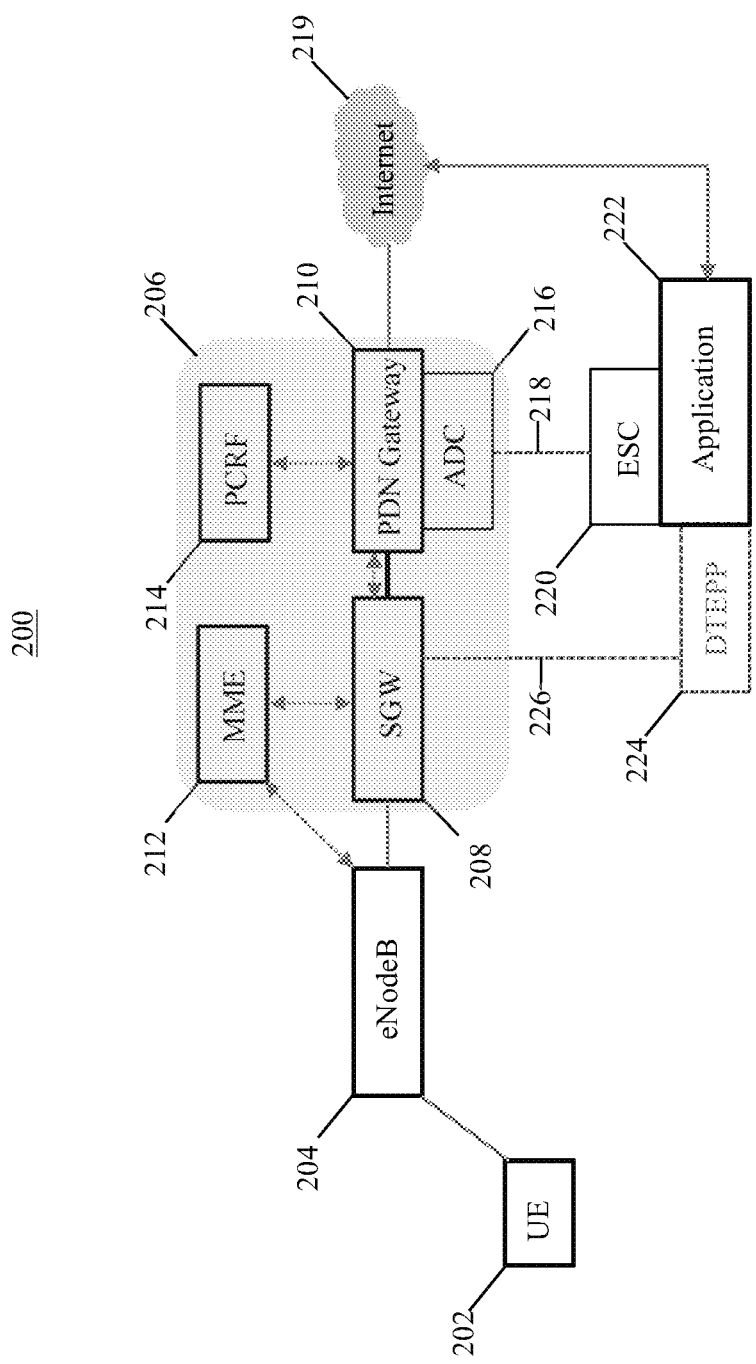
FIG. 2 illustrates an example set up for tunnel based processing of mobile traffic on an evolved packet core system, in accordance with some embodiments of the present technology.

FIG. 2 illustrate example mobile core system 200 according to some embodiments. The example system 200 in FIG. 2 comprises a User Equipment 202 connected to base station/eNodeB 204. eNodeB 204 established a connection with the Core Network/Evolved Packet core system 206 in order to transport user traffic to and from target destinations. The Core Network 206 comprises a Service Gateway 208 connected to a PDN Gateway 210. Serving Gate way 208 is also in communication with Mobility Management Entity 212 which it queries for required user-related information. Similarly PDN Gateway 210 is in communication with Policy Charging Rules Function 214 and comprise an inline/embedded Application Detection and Control (ADC) element 216.

Referring back to FIG. 2, as the user starts to send traffic, the Application Detection and Control (ADC) element 216 of the PDN Gateway 210 may be augmented to send CCR-U (Credit Control Request Update request) to the Policy Charging Rules Function (PCRF) 214 requesting an application specific dedicated bearer (logical channel associated with a specific level of packet forwarding treatment which applies to all types of traffic mapped to particular bearer). In the implementation of the aforementioned embodiment, normal User Equipment session establishment and data flow would be unchanged. ADC element 216 works in conjunction with PDN Gateway 210 to communicates with PCRF 214 and identify subscriber-application traffic. In this way ADC service enable policy-based QoS and charging/control actions to be enforced on the traffic flows in real time.

In some embodiments of the present technology, the aforementioned policy-based QoS charging/control action also initiates a Dynamic Tunnel End Point Processing/Processor (DTEPP) request 218 that is sent, through the internet 219, to the Elastic Service Controller (ESC) 220 of the application end-point server 222. The ESC 220 then instantiates one or more Dynamic Tunnel End Point Processor 224 on the application end-point server 222 of the target application and inform the PDN Gateway 210 of the relevant information with regards to the newly created Dynamic Tunnel End Point Processor 224. Once the Dynamic Tunnel End Point Processor 224 is ready, PDN Gateway will inform the Serving Gateway 208 to transfer the Tunnel Endpoint Identifiers and application specific Traffic Flow Template (TFT) to the Dynamic Tunnel End Point Processor 224. Application traffic is then tunneled directly to the application end-point server via logical connection 226 established between boundary device of the Core Network and the particular application server.

Traffic Flow Template (TFT) is a set of information records that is used to map a Service Data Flows to a specific Radio Bearer or that allow the General Packet Radio Service (GPRS) Core Network to classify packets received from an external network into the correct Packet Data Protocol context. The new Dynamic Tunnel End Point Processor 224 may also establish a connection to the PCRF 214 to inform of billing data.

In way of an example, consider user generated request for an iTunes service. The request is detected by the PDN Gateway. The PDN Gateway initiates a request for a Dynamic Tunnel End Point Processor dispatched to ESC element of the iTunes server located in the iTunes data center. The ESC element of the iTunes server would then initiate a Dynamic Tunnel End Point Processor. Once established, the new dynamically initiated Tunnel End Point Processor on the iTunes server informs the PDN Gateway that the Tunnel End Point Processor is ready. At this point the PDN Gateway informs the Serving Gateway to transfer the user iTunes traffic over to the new Dynamic Tunnel End point Processor.

Figure 3:
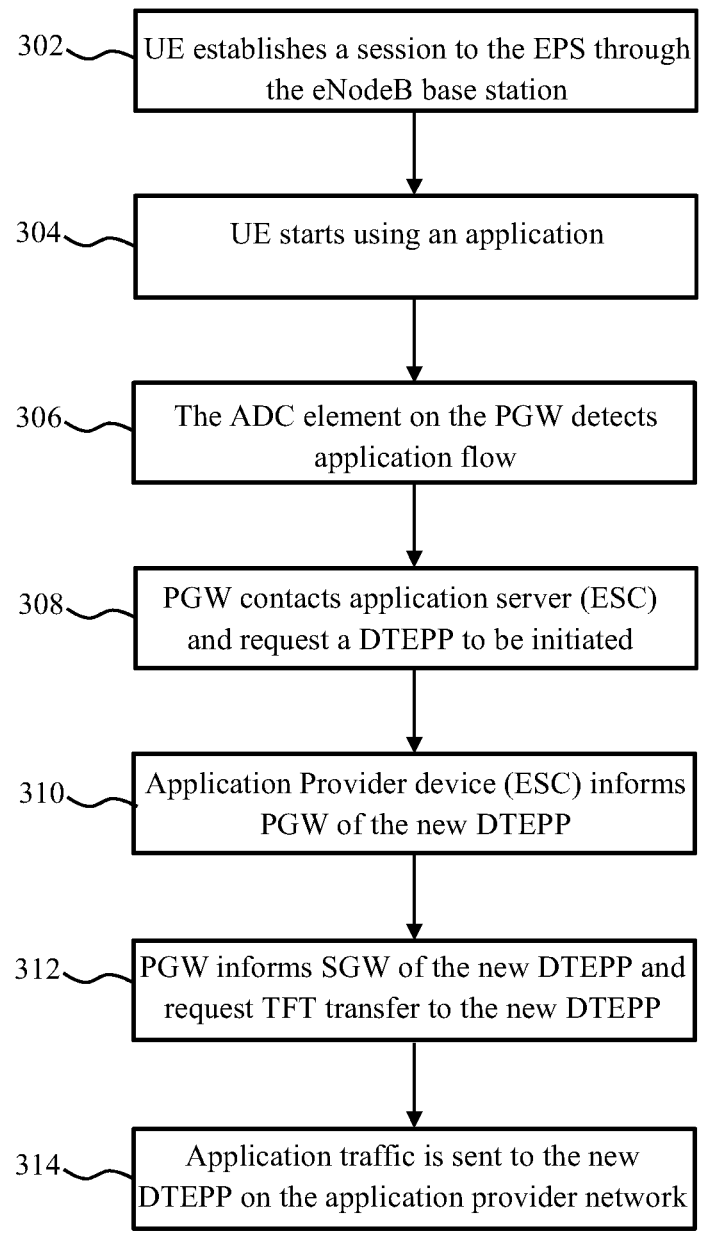
FIG. 3 illustrates an example flowchart describing tunnel based processing of mobile traffic on an evolved packet core system, in accordance with some embodiments of the present technology.

FIG. 3 illustrates an example flow chart 300 for basic operation implemented in accordance to some embodiments of the present technology. Referencing flow chart 300 at step 302 User Equipment (i.e., smart phone) established a session to the Evolved Packet Core (EPC) through a corresponding eNodeB base station. Once a connection is established, an application program is launched by the User Equipment (204). At step 306, the application traffic is detected by Application Detection and Control (ADC) function provided by the EPC boundary device (PDN Gate way). At step 308, the PDN gateway device locates the endpoint server of the requested application and send a request to the associated Elastic Service Controller for a Dynamic End Point Processor to be initiated on the application endpoint server. At step 310 The application endpoint server initiates the Tunnel End Point Processor and informs the PDN Gateway of the new tunnel endpoint processor. Accordingly, at step 312, the PDN Gateway device informs the Serving Gateway of the new tunnel endpoint processor on the application endpoint server and request relevant information such as tunnel endpoint identifier and Traffic Flow Template to be transferred to the new tunnel endpoint processor. Once a direct tunnel between EPC boundary device (i.e., Serving Gateway, Packet Gateway) is established, application specific traffic is directly tunneled to the new Tunnel endpoint processor dynamically initiated on application endpoint server located on the application provider network.

The described embodiment results in colocation of mobile tunnel endpoint and the serving device/resources (i.e. CPU, memory). Mobile traffic will then go directly to the Dynamic Tunnel End point Processor (DTEPP), and not result in decapsulated internet traffic. Therefore, embodiments of the present technology, are directed at dynamic instantiation of application specific tunnel encapsulation/decapsulation processor at the application endpoint server, amounting to on-demand per-application user plane function.

Other embodiments may involve the use of Segment Routing with IPv6 forwarding plane (SRv6) technology for dynamically instantiating a SRv6 tunnel endpoint at the servers location. Thereby, streamlining user mobile traffic directly to the location of the server processing the application data. This embodiment is described by the example illustrated in FIG. 4.

Figure 4:
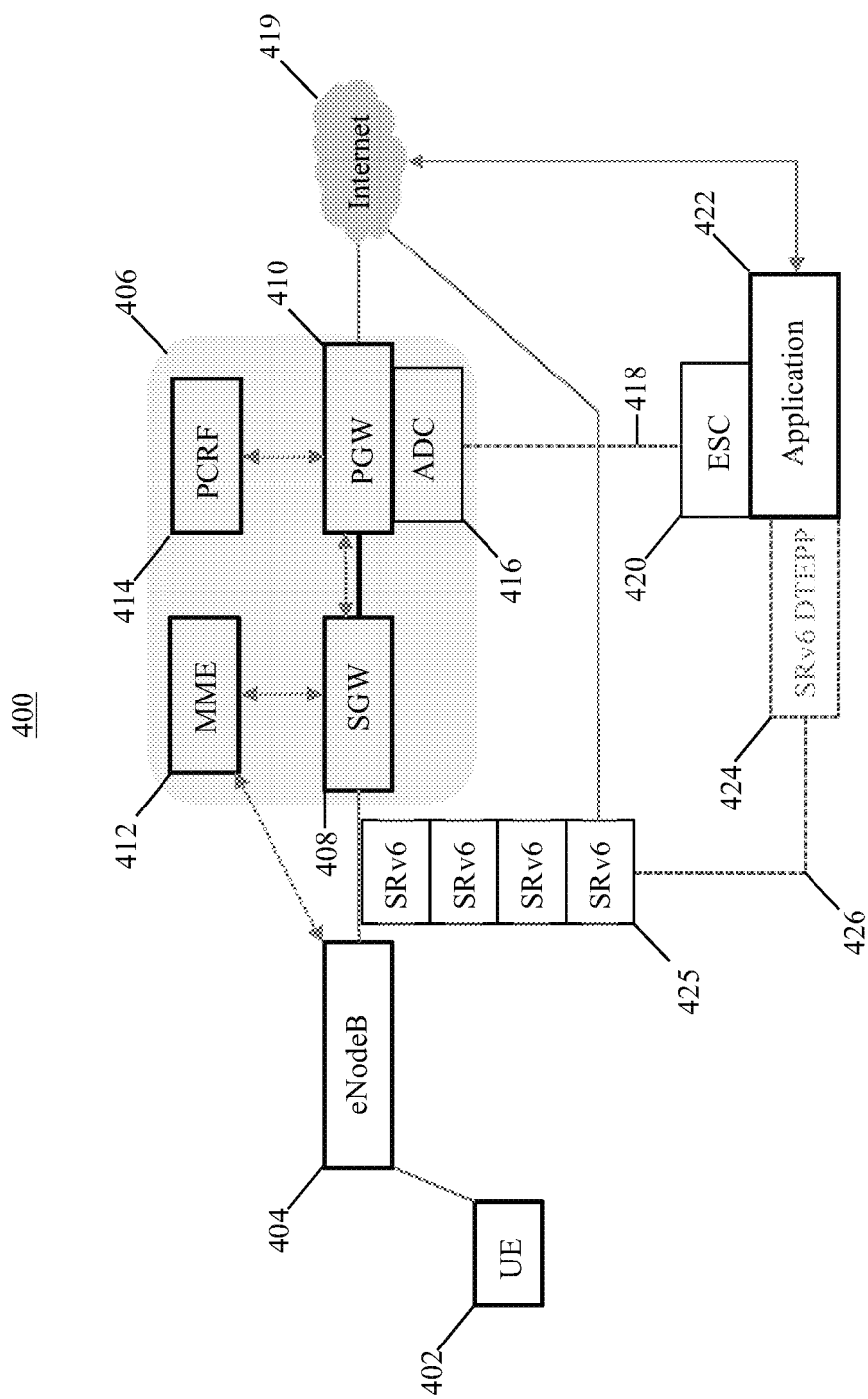
FIG. 4 illustrates an example set up for Segment Routing (SRv6) based processing of mobile traffic on an evolved packet core system, in accordance with some embodiments of the present technology.

FIG. 4 illustrate example implementation according to some embodiments. The example system 400 in FIG. 4 comprises a User Equipment 402 connected to base station/eNodeB 404, eNodeB 404 established a connection with the Core Network/Evolved Packet core system 406 in order to transport user traffic to and from target destinations. The Core Network 406 comprises a Service Gateway 408 connected to a PDN Gateway 410. Serving Gate way 408 is also in communication with Mobility Management Entity 412 which it queries for required user-related information. Similarly PDN Gateway 410 is in communication with Policy Charging Rules Function 414 and comprise an inline/embedded Application Detection and Control (ADC) element 416.

As the user starts to send traffic, the Application Detection and Control (ADC) element 416 of the PDN Gateway 410 may be augmented to send CCR-U (Credit Control Request Update request) to the Policy Charging Rules Function (PCRF) 414 requesting an application specific dedicated bearer (logical channel associated with a specific level of packet forwarding treatment which applies to all types of traffic mapped to particular bearer). In the implementation of the aforementioned embodiment, normal User Equipment session establishment and data flow would be unchanged. ADC element 416 works in conjunction with PDN Gateway 410 to communicates with PCRF 414 and identify subscriber-application traffic. In this way ADC service enable policy-based QoS and charging/control actions to be enforced on the traffic flows in real time.

In some embodiments of the present technology, the PDN Gateway 410 also initiate a Dynamic SRv6 tunnel endpoint instance (i.e., SRv6 end.DX2 instance) request 418 that is sent, through the internet 419, to the Elastic Service Controller (ESC) 420 of the application end-point server 422. The ESC 420 then instantiates one or more SRv6 Dynamic Tunnel End Point Processor 424 on the application end-point server 422 of the target application and inform the PDN Gateway 410 of the Segment Identifier (SID) of the newly created Dynamic SRv6 Tunnel endpoints. Once the Dynamic Tunnel End Point Processor 424 is ready, PDN Gateway would inform the Tunnel exchange Segment Router 425 about the new endpoint. The Tunnel exchange Segment Router 425 then updates the SRv6 extension header with the new endpoint. Application traffic is then tunneled directly to the application end-point server via logical connection 426 established between tunnel exchange Segment Router 425 and the target application server and decrypted/decapsulated by the new dynamic SRv6 endpoint 424 located on the application providers network server 422.

Figure 5:
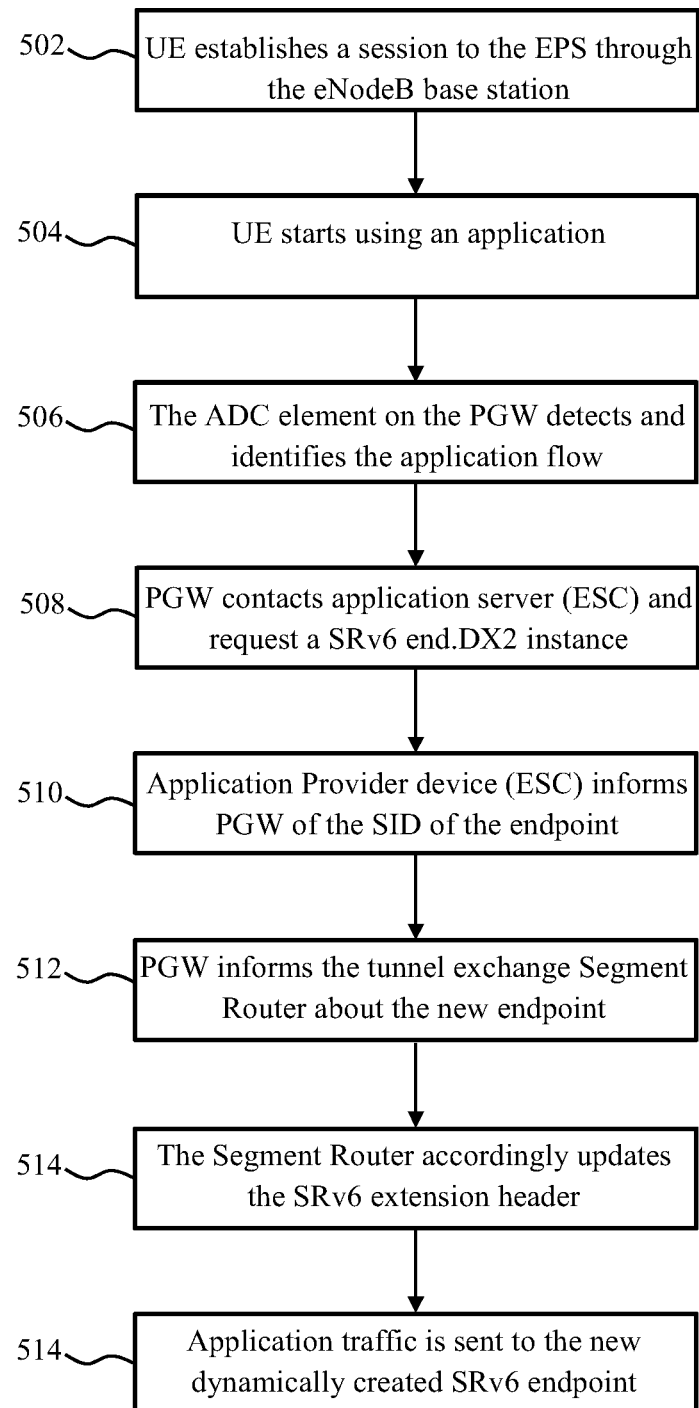
FIG. 5 illustrates an example flowchart describing Segment Routing (SRv6) based processing of mobile traffic on an evolved packet core system, in accordance with some embodiments of the present technology.

FIG. 5 illustrates an example flow chart 500 for basic operation implemented in accordance to aforementioned embodiment of the present technology. Referencing flow chart 500 at step 502 User Equipment (i.e., smart phone) established a session to the Evolved Packet Core (EPC) through a corresponding eNodeB base station. Once a connection is established, an application program is launched by the User Equipment (504). At step 506, the application traffic is detected by Application Detection and Control (ADC) function provided by the EPC boundary device (PDN Gateway). At step 508, the PDN gateway device locates the endpoint server of the requested application and send a request to the associated Elastic Service Controller for a Dynamic SRv6 End Point Processor (SRv6 end.DX2) to be initiated on the application endpoint server. At step 510, the application endpoint server initiates the SRv6 End Point Processor and informs the PDN Gateway of the new SID of the endpoint processor. Accordingly, at step 512, the PDN gateway device informs the tunnel exchange Segment Router about the new tunnel endpoint processor on the application endpoint server and request relevant information such as tunnel endpoint identifier and Traffic Flow Template to be transferred to the new tunnel endpoint processor. The tunnel exchange Segment Router accordingly updates the SRv6 extension header with the new endpoint(s). Once a direct tunnel between EPC boundary device (i.e., Serving Gateway, Packet Gateway, tunnel exchange Segment Router) is established, application specific traffic is directly tunneled to the new SRv6 endpoint processor dynamically initiated on the application server located on the application provider network.

Other embodiment of the present technology may include a network initiated switchover that causes the eNodeB to start forwarding the application specific traffic directly to the Dynamic Tunnel End point Processor (DTEPP).

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   detecting a source application associated with a data traffic flow;
   locating a serving device associated with the source application;
   requesting a tunnel end point processor to be instantiated at the serving device;
   transferring information associated with the data traffic flow to the tunnel end point processor instantiated at the serving device; and
   forwarding data traffic associated with the source application to the tunnel end point processor on the serving device.

2. The computer-implemented method of claim 1, wherein the serving device associated with the source application is located on an application provider network.

3. The computer-implemented method of claim 1, wherein the information associated with the data traffic flow to the tunnel end point processor comprises one or more traffic flow templates.

4. The computer-implemented method of claim 1, wherein information associated with the data traffic flow to the tunnel end point processor comprises one or more tunnel endpoint identifiers.

5. The computer-implemented method of claim 1, wherein detecting the source application associated with the data traffic flow is performed via a packet data network gateway device.

6. The computer-implemented method of claim 1, wherein the tunnel end point processor comprises a segment routing end point processor.

7. The computer-implemented method of claim 6, wherein requesting the tunnel end point processor to be instantiated at the serving device comprises providing the segment routing end point processor at the serving device.

8. A system comprising:
one or more processors; and
at least one non-transitory computer-readable medium having stored therein instructions that, when executed by the one or more processors, cause the one or more processors to:
detect a source application associated with a data traffic flow;
locate a serving device associated with the source application;
request a tunnel end point processor to be instantiated at the serving device;
transfer information associated with the data traffic flow to the tunnel end point processor instantiated at the serving device; and
forward data traffic associated with the source application to the tunnel end point processor on the serving device.

9. The system of claim 8, wherein the serving device associated with the source application is located on an application provider network.

10. The system of claim 8, wherein the information associated with the data traffic flow to the tunnel end point processor comprises one or more traffic flow templates.

11. The system of claim 8, wherein information associated with the data traffic flow to the tunnel end point processor comprises one or more tunnel endpoint identifiers.

12. The system of claim 8, wherein detecting the source application associated with the data traffic flow is performed via a packet data network gateway device.

13. The system of claim 8, wherein the tunnel end point processor comprises a segment routing end point processor.

14. The system of claim 13, wherein requesting the tunnel end point processor to be instantiated at the serving device comprises providing the segment routing end point processor at the serving device.

15. A non-transitory computer-readable storage medium comprising instructions stored therein which, when executed by one or more processors, cause the one or more processors to:
detect a source application associated with a data traffic flow;
locate a serving device associated with the source application;
request a tunnel end point processor to be instantiated at the serving device;
transfer information associated with the data traffic flow to the tunnel end point processor instantiated at the serving device; and
forward data traffic associated with the source application to the tunnel end point processor on the serving device.

16. The non-transitory computer-readable storage medium of claim 15, wherein the information associated with the data traffic flow to the tunnel end point processor comprises one or more traffic flow templates.

17. The non-transitory computer-readable storage medium of claim 15, wherein information associated with the data traffic flow to the tunnel end point processor comprises one or more tunnel endpoint identifiers.

18. The non-transitory computer-readable storage medium of claim 15, wherein detecting the source application associated with the data traffic flow is performed via a packet data network gateway device.

19. The non-transitory computer-readable storage medium of claim 15, wherein the tunnel end point processor comprises a segment routing end point processor.

20. The non-transitory computer-readable storage medium of claim 19, wherein requesting the tunnel end point processor to be instantiated at the serving device comprises providing the segment routing end point processor at the serving device.

* * * * *